(12) United States Patent
Urakawa

(10) Patent No.: US 10,767,889 B2
(45) Date of Patent: Sep. 8, 2020

(54) CENTRAL AIR CONDITIONING SYSTEM

(71) Applicant: DENSO WAVE INCORPORATED, Chita-gun, Aichi-pref. (JP)

(72) Inventor: Takayuki Urakawa, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 29 days.

(21) Appl. No.: 16/185,714

(22) Filed: Nov. 9, 2018

(65) Prior Publication Data
US 2019/0178525 A1    Jun. 13, 2019

(30) Foreign Application Priority Data

Dec. 13, 2017  (JP) ................................. 2017-238619

(51) Int. Cl.
| | |
|---|---|
| F24F 11/76 | (2018.01) |
| F24F 11/63 | (2018.01) |
| F24F 3/044 | (2006.01) |
| G05B 19/042 | (2006.01) |
| F24F 110/10 | (2018.01) |

(52) U.S. Cl.
CPC .............. *F24F 11/76* (2018.01); *F24F 3/044* (2013.01); *F24F 11/63* (2018.01); *G05B 19/042* (2013.01); *F24F 2110/10* (2018.01); *G05B 2219/2614* (2013.01)

(58) Field of Classification Search
CPC .. F24F 11/76; F24F 3/044; F24F 11/63; F24F 2110/10; G05B 19/042; G05B 2219/2614
See application file for complete search history.

(56) References Cited

U.S. PATENT DOCUMENTS

| | | | | |
|---|---|---|---|---|
| 2011/0082602 A1* | 4/2011 | Tanaka | ..................... | F24F 11/30 |
| | | | | 700/300 |
| 2012/0260678 A1* | 10/2012 | Yoshida | ................ | F25B 41/062 |
| | | | | 62/56 |
| 2013/0006426 A1* | 1/2013 | Healey | ............... | H05K 7/20836 |
| | | | | 700/278 |

FOREIGN PATENT DOCUMENTS

JP            4668770 B2    4/2011

* cited by examiner

*Primary Examiner* — Charles R Kasenge
(74) *Attorney, Agent, or Firm* — Oliff PLC

(57) ABSTRACT

A central air conditioning system includes dampers individually air conditioning multiple spaces, an air conditioning controller controlling the dampers, a temperature sensor disposed in each space to detect a temperature, and a temperature predictor that receives the detected temperature, predicts a temperature in each space, and transmits temperature information to the air conditioning controller. The temperature sensor may wirelessly transmit the detected temperature when an amount of change in temperature gradient exceeds an allowable range. Alternatively, the temperature sensor may predict a temperature based on a temperature gradient, and wirelessly transmit the detected temperature when a difference between the predicted and detected temperatures exceeds a certain range. Alternatively, the temperature sensor may predict a temperature by using one of prediction formulae, and transmit the detected temperature when a difference between the predicted and detected temperatures exceeds a certain range.

7 Claims, 12 Drawing Sheets

CENTRAL AIR CONDITIONING SYSTEM

CROSS REFERENCE TO RELATED APPLICATION

The present application claims the benefit of priority from Japanese Patent Application No. 2017-238619 filed on Dec. 13, 2017. The entire disclosure of the above application is incorporated herein by reference.

TECHNICAL FIELD

The present disclosure relates to a central air conditioning system.

BACKGROUND

A central air conditioning system is required to be easily installed not only for new buildings but also for existing buildings. When installing the central air conditioning system, it is necessary to wire a power line and a signal line through a wall to multiple units such as an air conditioner, a controller, dampers and sensors of respective parts. Such wiring may be troublesome and costly.

In order to reduce such troubles and expenses, the power line and the signal line may be omitted. For example, the temperature sensor may intermittently transmit a wireless signal of detected temperature information by using a battery as a power supply. In this case, the shorter the interval of transmitting the temperature information, the higher an accuracy of temperature control in air conditioning, but on the other hand, the power consumption increases. Then, the size of the battery may need to be increased. As a result, the size of the sensor unit may be increased, and the cost of the battery may be increased.

SUMMARY

According to at least one embodiment, a central air conditioning system includes dampers that individually air-conditions multiple spaces, an air conditioning controller configured to instruct the dampers to perform a control operation for the individual air conditioning of the multiple spaces, a temperature sensor disposed in each of the multiple spaces, and a temperature predictor. The temperature sensor is configured to: detect a temperature and calculate an amount of change in temperature gradient at sampling time intervals; and transmit the detected temperature and the temperature gradient via a wireless communication when the amount of change in temperature gradient exceeds an allowable range. The temperature predictor, upon receiving the temperature and the temperature gradient, is configured to: predict a temperature in each of the multiple spaces to generate temperature information depending on elapsed time that passes from the timing of the receiving of the temperature and the temperature gradient; and transmit the temperature information to the air conditioning controller.

According to at least one embodiment, a central air conditioning system includes dampers that individually air-conditions multiple spaces, an air conditioning controller configured to instruct the dampers to perform a control operation for the individual air conditioning of the multiple spaces, a temperature sensor disposed in each of the multiple spaces, and a temperature predictor. The temperature sensor is configured to: detect a temperature at sampling time intervals; predict a temperature based on a temperature gradient calculated last time; and newly calculate the temperature gradient and transmit the calculated temperature gradient together with the detected temperature via a wireless communication when a difference between the predicted temperature and the actually detected temperature exceeds a certain range. The temperature predictor, upon receiving the temperature and the calculated temperature gradient, is configured to: predict a temperature in each of the multiple spaces to generate temperature information depending on elapsed time that passes from the timing of the receiving of the temperature and the calculated temperature gradient; and transmit the temperature information to the air conditioning controller.

According to at least one embodiment, a central air conditioning system includes dampers that individually air-conditions multiple spaces, an air conditioning controller configured to instruct the dampers to perform a control operation for the individual air conditioning of the multiple spaces, a temperature sensor disposed in each of the multiple spaces, and a temperature predictor. The temperature sensor is configured to: detect a temperature at sampling time intervals; predict a temperature by using one of multiple prediction formulae which has been stored in the temperature sensor in advance for temperature prediction; and newly select another of the multiple prediction formulae and transmit information of the detected temperature and the selected prediction formula when a difference between the predicted temperature and the actually detected temperature exceeds a certain range. The temperature predictor, upon receiving the information of the detected temperature and the selected prediction formula, is configured to: predict a temperature in each of the multiple spaces by using the selected prediction formula to generate temperature information depending on elapsed time that passes from the timing of the receiving of the information of the detected temperature and the selected prediction formula; and transmit the temperature information to the air conditioning controller.

DETAILED DESCRIPTION

Figure 1:
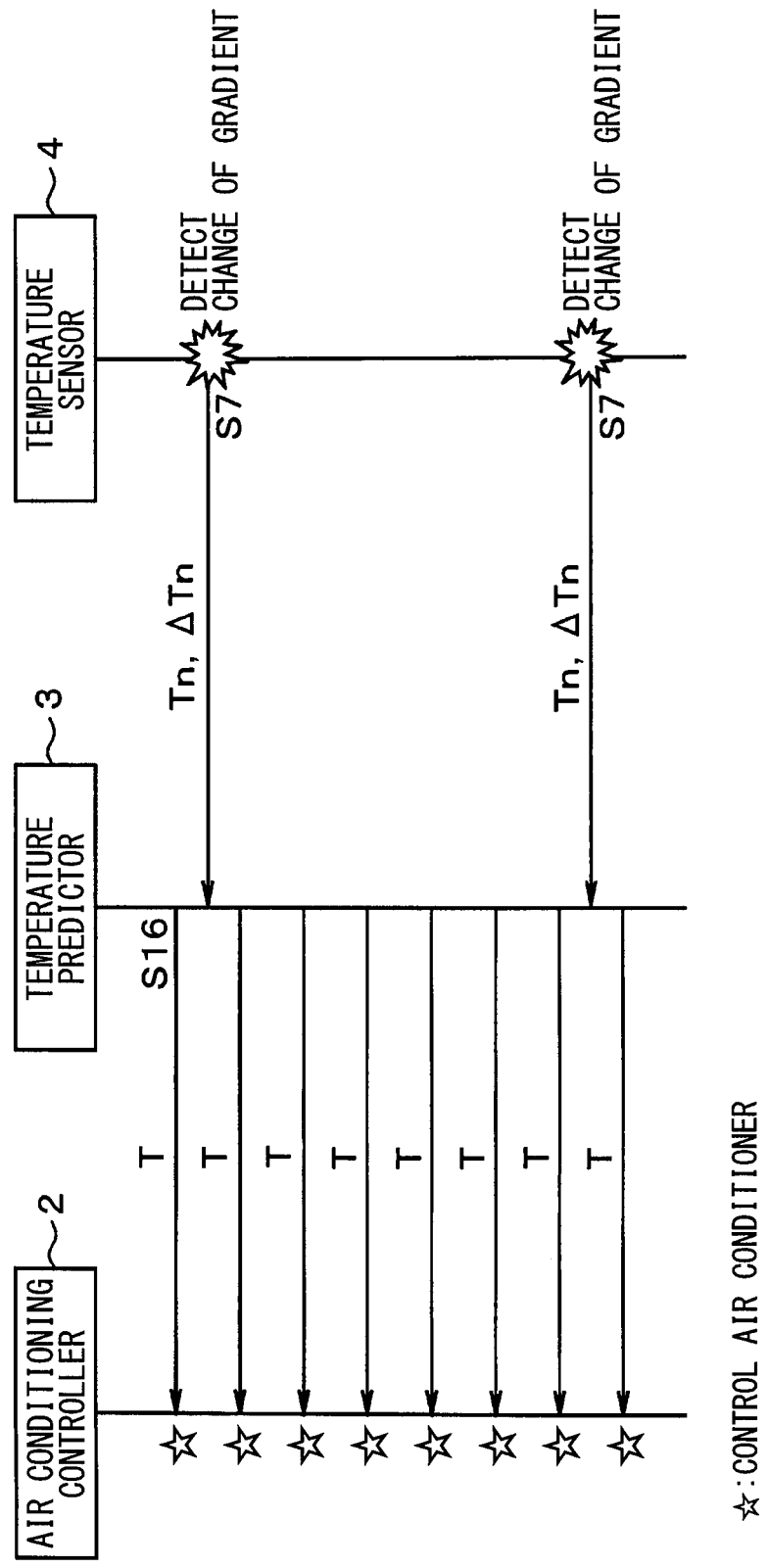
FIG. 1 is a sequence diagram showing communication processes performed between an air conditioning controller, a temperature predictor, and a temperature sensor according to at least one embodiment.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment will be described with reference to FIGS. 1 to 6. FIG. 2 is a functional block diagram showing a configuration of a central air conditioning system. The connections between the elements, shown in FIG. 2, are of a power supply system, a control system or a communication system. A central air conditioning system includes an air conditioner 1, an air conditioning controller 2 and a temperature predictor 3. In this example, three spaces, for example, rooms are subject to air-conditioning control, and temperature sensors 4(1), 4(2), 4(3) and dampers 5(1), 5(2), 5(3) are arranged corresponding to each room. The dampers 5 are examples of an air conditioning unit.

Commercial AC power is supplied to the air conditioner 1 and the air conditioning controller 2 via a breaker and a power line 6. The air conditioner 1 has therein a thermal cycle and generates warm air or cold air by the thermal cycle. The generated warm air or cold air is supplied to each room via a duct and the dampers 5(1), 5(2), 5(3). The air conditioning controller 2 controls the air conditioner 1 via a control line 7. The air conditioning controller 2 may be fully implemented by a special purpose computer created by configuring a processor programmed to execute one or more particular functions embodied in computer programs. Alternatively, the air conditioning controller 2 may be fully implemented by special purpose hardware logic circuits. Further alternatively, the air conditioning controller 2 may be implemented by a special purpose computer created by a combination of a processor executing computer programs coupled with hardware logic circuits.

The air conditioning controller 2 and the temperature predictor 3 are connected through a power line 8 and a control line 9. A power circuit in the air conditioning controller 2 generates and supplies a direct current power as an operating power to the temperature predictor 3. The air conditioning controller 2 performs wire communication with the temperature predictor 3 through the control line 9. The air conditioning controller 2 and a screen 10 are connected through a power line 11 and a control line 12. Similarly, the direct current power is supplied as an operating power to the screen 10, and the air conditioning controller 2 controls display of information about the air-conditioning control performed on the screen 10 via the control line 12.

The temperature predictor 3 also has a function as a damper controller, and the temperature predictor 3 and each damper 5 is connected through a power line 13 and a control line 14. The direct current power is supplied to the damper 5 as an operating power via the temperature predictor 3, and the temperature predictor 3 controls opening and closing of the damper 5 via the control line 14.

Each temperature sensor 4 includes a microcomputer and a temperature detector having a thermistor, and operates by battery power. The temperature sensor 4 performs wireless communication with the temperature predictor 3 and transmits information about a detected room temperature to the temperature predictor 3.

Figure 3:
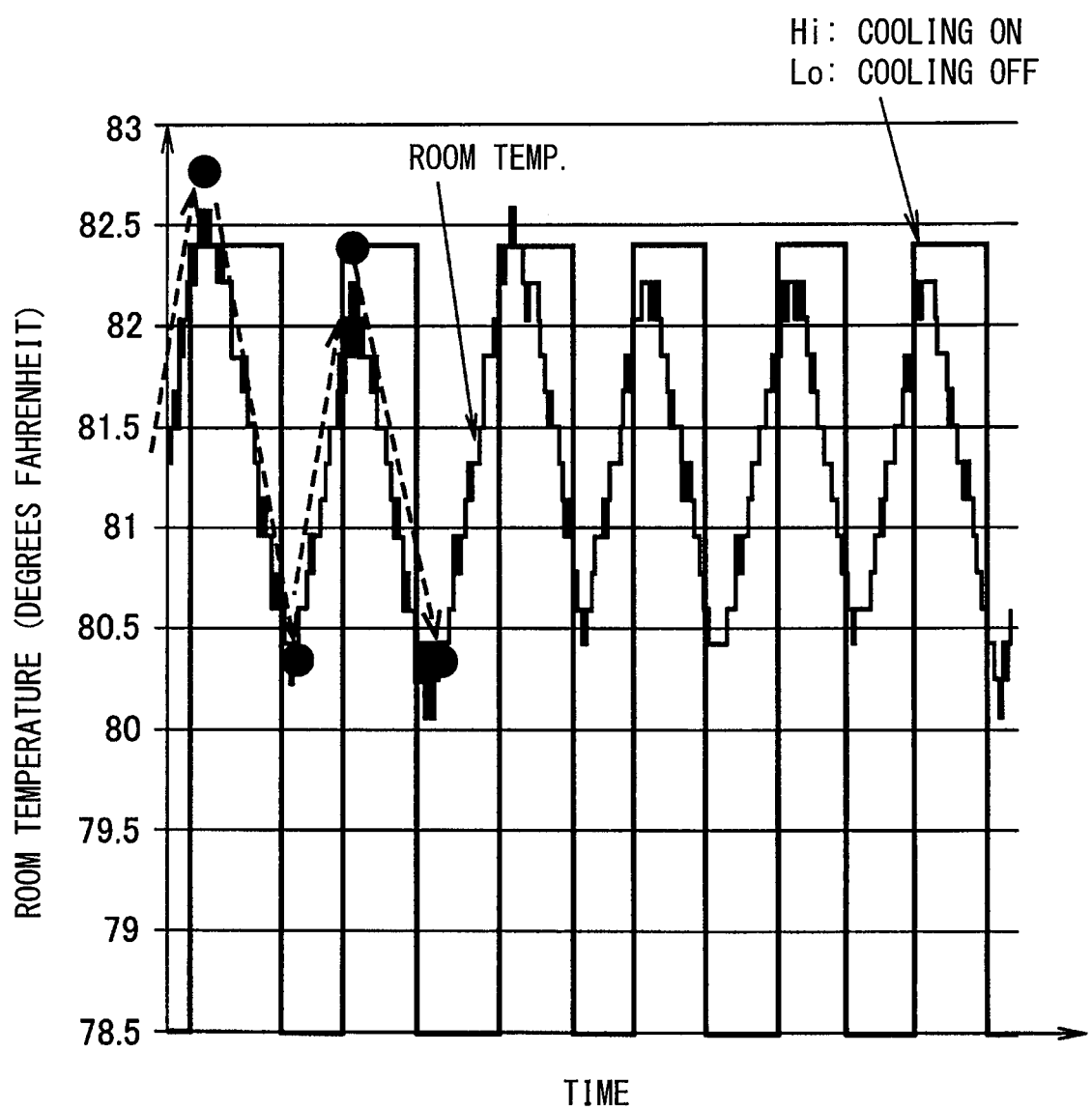
FIG. 3 is a diagram showing an example of air conditioning control in a general cooling operation according to at least one embodiment.

Next, operation of the present embodiment will be described. FIG. 3 shows an example of an air-conditioning control in a general cooling operation, and a room temperature in the vertical axis is shown in degrees Fahrenheit. When the control target temperature is 81.5° F. and the room temperature exceeds, for example, by +0.5° F. while cooling is OFF, the cooling is turned ON. When a little time elapses from that point in time, the room temperature begins to decrease. When the temperature goes below the control target temperature, for example, by −1° F., the cooling is turned OFF.

In this manner, the room temperature during the air-conditioning control repeats rising and falling, and a temperature gradient largely changes immediately after the timing of turning on and off the air conditioning. Other than that, the rate of temperature change is nearly constant. Based on this tendency, in the present embodiment, a control is performed as follows.

Figure 2:
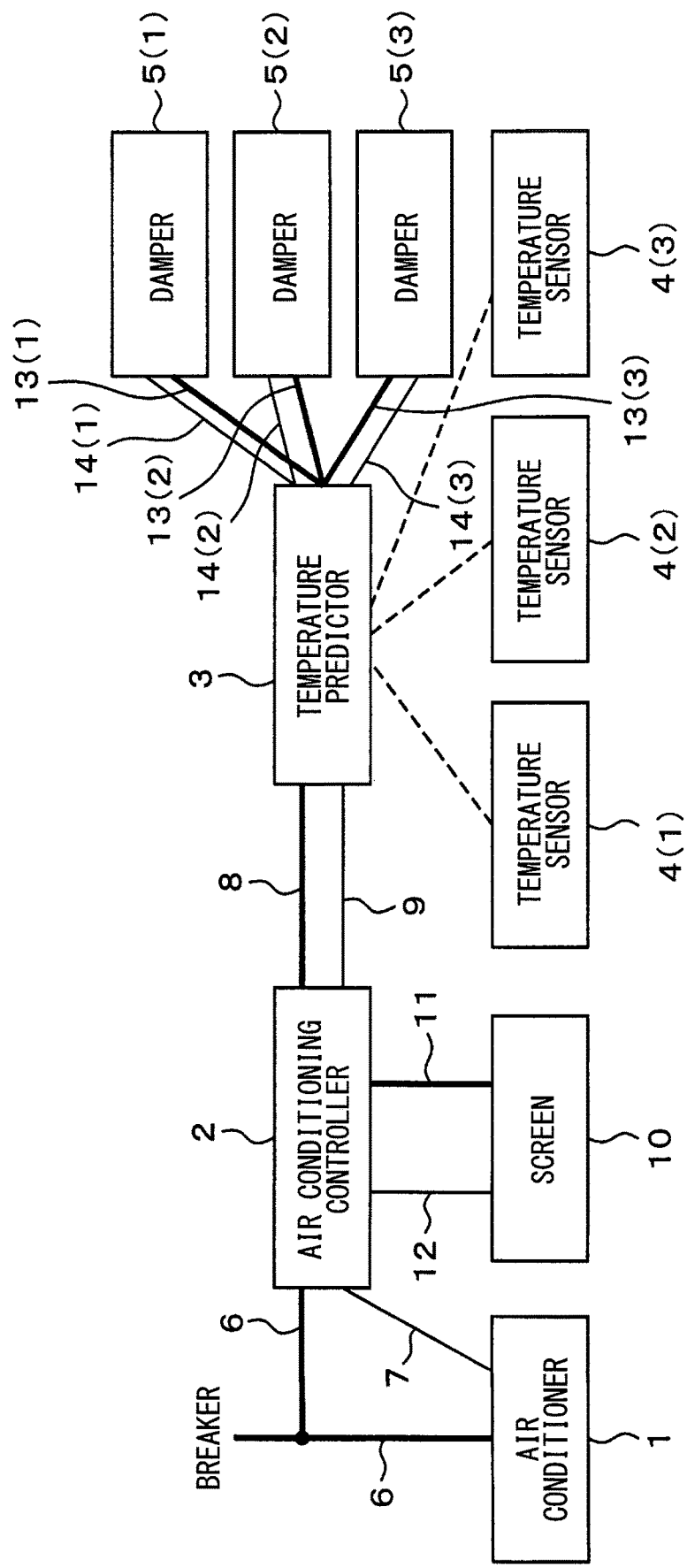
FIG. 2 is a functional block diagram showing a configuration of a central air conditioning system according to at least one embodiment.
Figure 4:
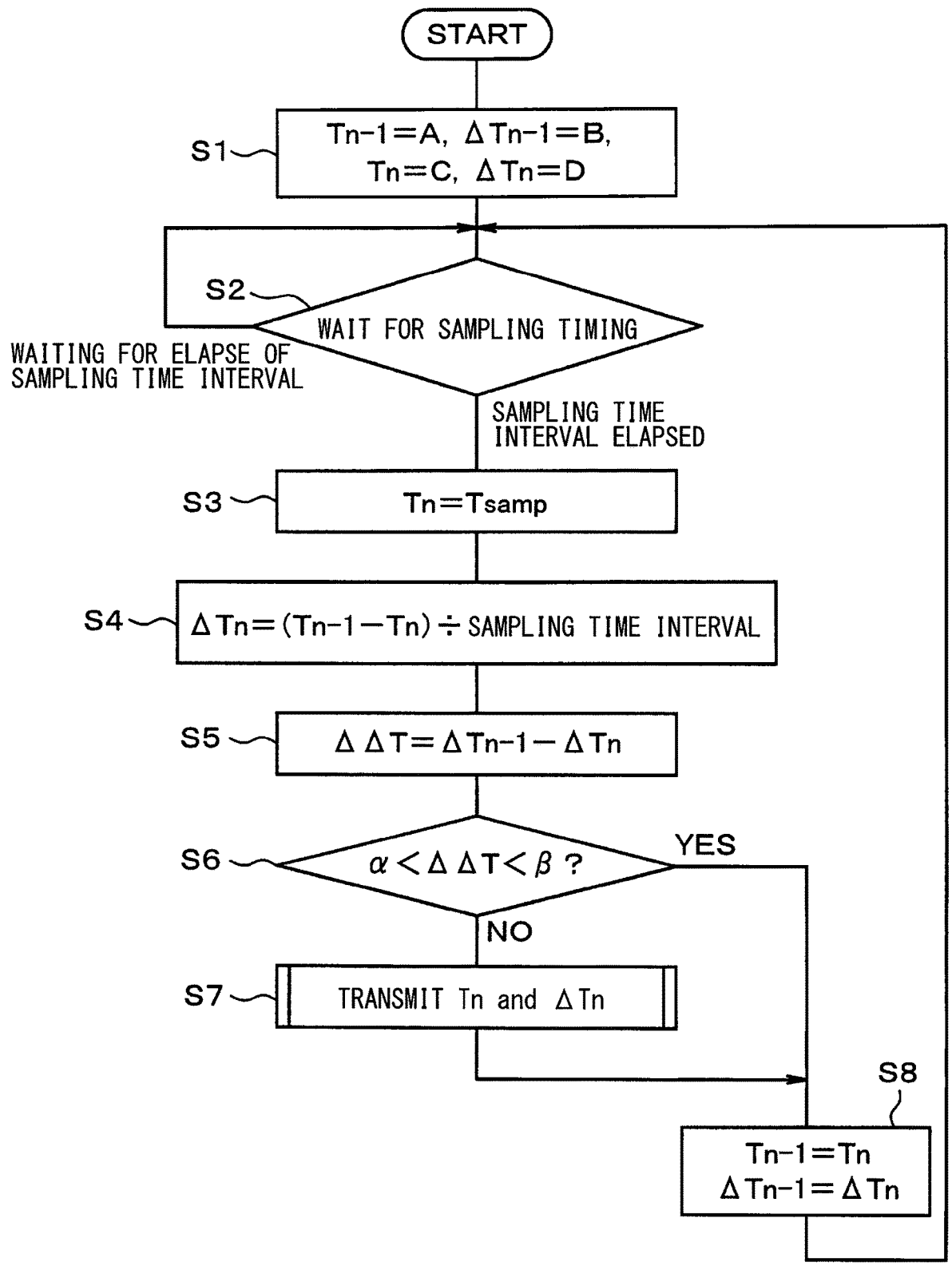
FIG. 4 is a flowchart showing a control process performed by a temperature sensor according to at least one embodiment.

FIG. 1 is a sequence diagram showing communication processes performed between the air conditioning controller 2, the temperature predictor 3, and the temperature sensor 4. FIG. 4 is a flowchart showing a process performed by the temperature sensor 4, and FIGS. 5 and 6 are flowcharts showing processes performed by the temperature predictor 3.

As shown in FIG. 4, at step S1, the temperature sensor 4 sets a detected temperature $Tn-1$ of the last control cycle, a temperature gradient $\Delta Tn-1$ of the last control cycle, a detected temperature $Tn$ of the current control cycle, and a temperature gradient $\Delta Tn$ of the current control cycle, respectively, to arbitrary values A, B, C and D. Then, the temperature sensor 4 waits for the timing of sampling a room temperature to come at step S2. In other words, the temperature sensor 4 waits for a sampling time interval to elapse. The sampling time interval is, for example, about one minute. At the sampling timing, the temperature sensor 4 detects and assigns a temperature Tsamp to the variable Tn of the present temperature at step S3. Then, at step S4, the temperature sensor 4 calculates the temperature gradient $\Delta Tn$ by the equation: $\Delta Tn=(Tn\text{-}1-Tn)/(\text{sampling time interval})$ Subsequently, at step S5, the temperature sensor 4 calculates an amount $\Delta\Delta T$ of change in temperature gradient $\Delta Tn$ by subtracting $\Delta Tn$ from $\Delta Tn\text{-}1$ (i.e. $\Delta Tn\text{-}1-\Delta Tn$). The temperature sensor 4 determines at step S6 whether the change amount $\Delta\Delta T$ is within an allowable range by using an inequality: $\alpha<\Delta\Delta T<\beta$. The thresholds $\alpha$ and $\beta$ are also arbitrarily determined.

When the change amount $\Delta\Delta T$ is within the allowable range at step S6 (YES), the temperature variable Tn is substituted for the variable Tn-1, and the gradient variable $\Delta Tn$ is substituted for $\Delta Tn\text{-}1$ at step S8. Then, the process returns to step S2. On the other hand, when the change amount $\Delta\Delta T$ is out of the allowable range at step S6 (NO), the current temperature Tn and the gradient $\Delta Tn$ are transmitted to the temperature predictor 3 at step S7, and the process proceeds to step S8.

Figure 5:
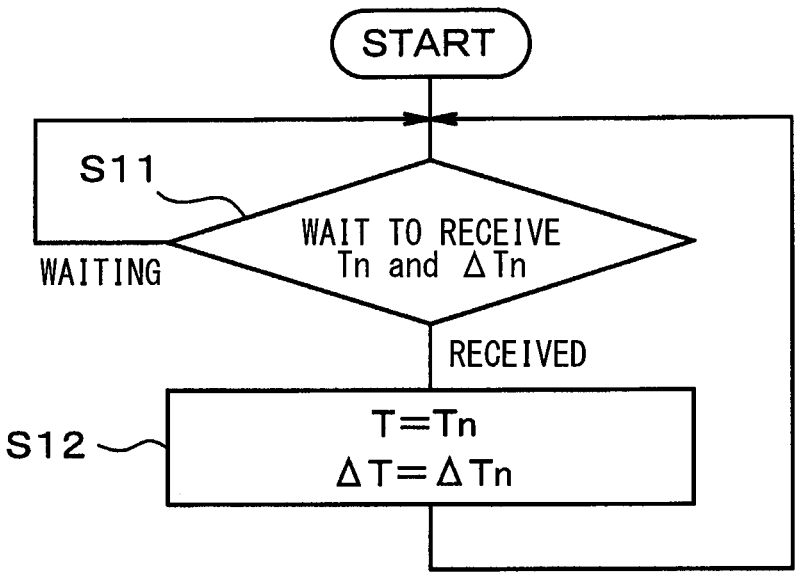
FIG. 5 is a flowchart showing a receiving standby process performed by a temperature predictor according to at least one embodiment.
Figure 6:
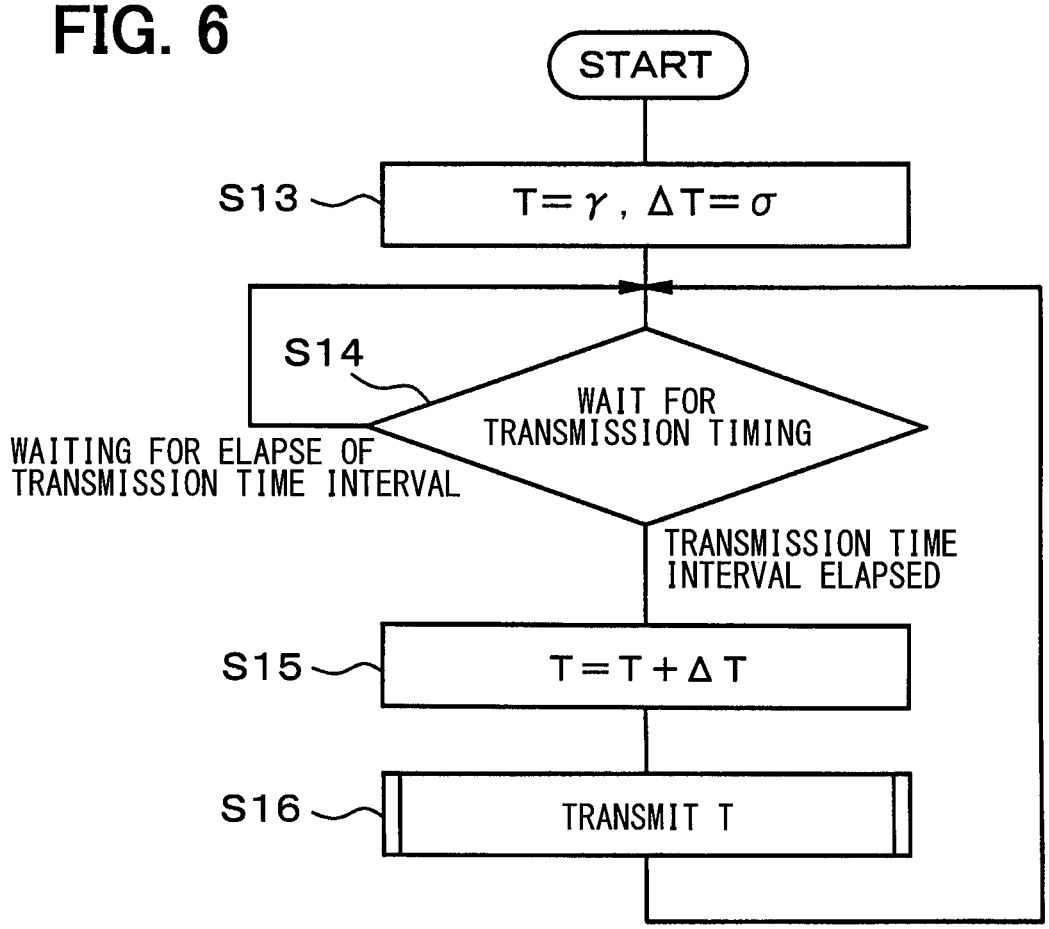
FIG. 6 is a flowchart showing a temperature prediction process performed by a temperature predictor according to at least one embodiment.

FIG. 5 is a flowchart showing a receiving standby process performed by the temperature predictor 3. The temperature predictor 3 waits to receive the temperature Tn and the gradient $\Delta Tn$ from the temperature sensor 4 at step S11. Upon receiving them, the temperature predictor 3 substitutes the temperature Tn for a variable T and substitutes the gradient $\Delta Tn$ for a variable $\Delta T$ at step S12, and then returns to step S11.

FIG. 6 is a flowchart showing a temperature prediction process performed by the temperature predictor 3. At step S13, the temperature predictor 3 initializes the variables T and $\Delta T$ to arbitrary values $\gamma$ and $\delta$, respectively. Then, the temperature predictor 3 waits for the timing of transmission to the air conditioning controller 2 at step S14. In other words, the temperature predictor 3 waits for a transmission time interval to elapse. The transmission time interval is, for example, about one minute. When the transmission timing comes, temperature prediction is performed at step S15 by the equation: $T=T+\Delta T$. Then, the temperature predictor 3 transmits the predicted temperature T to the air conditioning controller 2 at step S16, and the process returns to step S14.

As a result of the processing as described above, the wireless transmission from the temperature sensor 4 to the temperature predictor 3 is performed at the timing of step S7 when the temperature gradient has greatly changed. Then, the temperature predictor 3 transmits the temperature information T to the air conditioning controller 2 at regular intervals, for example, one minute intervals regardless of whether the temperature predictor 3 receives the temperature data from the temperature sensor 4. In response, the air conditioning controller 2 also controls the air conditioner 1 at one minute intervals. The air conditioner 1 drives the compressor to operate the thermal cycle in order to obtain an ability to satisfy a required air conditioning control amount of each room. The air conditioning controller 2 transmits a command corresponding to the required control amount of each room to the temperature predictor 3, and the temperature predictor 3 controls an opening degree of the damper 5 for each room.

As described above, according to the present embodiment, the air conditioning controller 2 sends instructions to the dampers 5 which can individually air condition the multiple spaces such that the dampers 5 performs control operations relating to the air conditioning of each space. The temperature sensor 4 is disposed in each of the multiple spaces to detect the temperature Tsamp and calculate the change amount $\Delta\Delta T$ of the temperature gradient $\Delta Tn$ at each sampling time interval. Then, when the change amount $\Delta\Delta T$ of the gradient exceeds the allowable range, the detected temperature Tn and the temperature gradient $\Delta Tn$ are transmitted by the temperature sensor 4 via wireless communication. The temperature predictor 3, upon receiving them, generates temperature information of a predicted temperature in each of the multiple spaces depending on elapsed time that passes from the receiving, and transmits the temperature information to the air conditioning controller 2.

According to the above-described configuration, the temperature sensor 4 transmits the temperature and the like to the temperature predictor 3 only when the temperature of the corresponding space changes relatively largely. Therefore, a frequency of performing the wireless communication can be reduced. Further, even during the period in which the transmission from the temperature sensor 4 to the temperature predictor 3 is not performed, the temperature sensor 4 predicts the temperature of the corresponding space based on the already received temperature and temperature gradient and transmits the temperature information T to the air conditioning controller 2. Therefore, the air conditioning controller 2 can instruct the air conditioning unit in each space to perform a control process based on the temperature information.

When the temperature of the corresponding space changes greatly, the temperature and the like are transmitted from the temperature sensor 4 and the information thereof is updated, and the temperature predictor 3 newly performs temperature prediction based on the updated information. Therefore, even when the temperature sensor 4 reduces the frequency of wireless communication, accuracy of the air conditioning control can be maintained without deteriorating.

Second Embodiment

Figure 7:
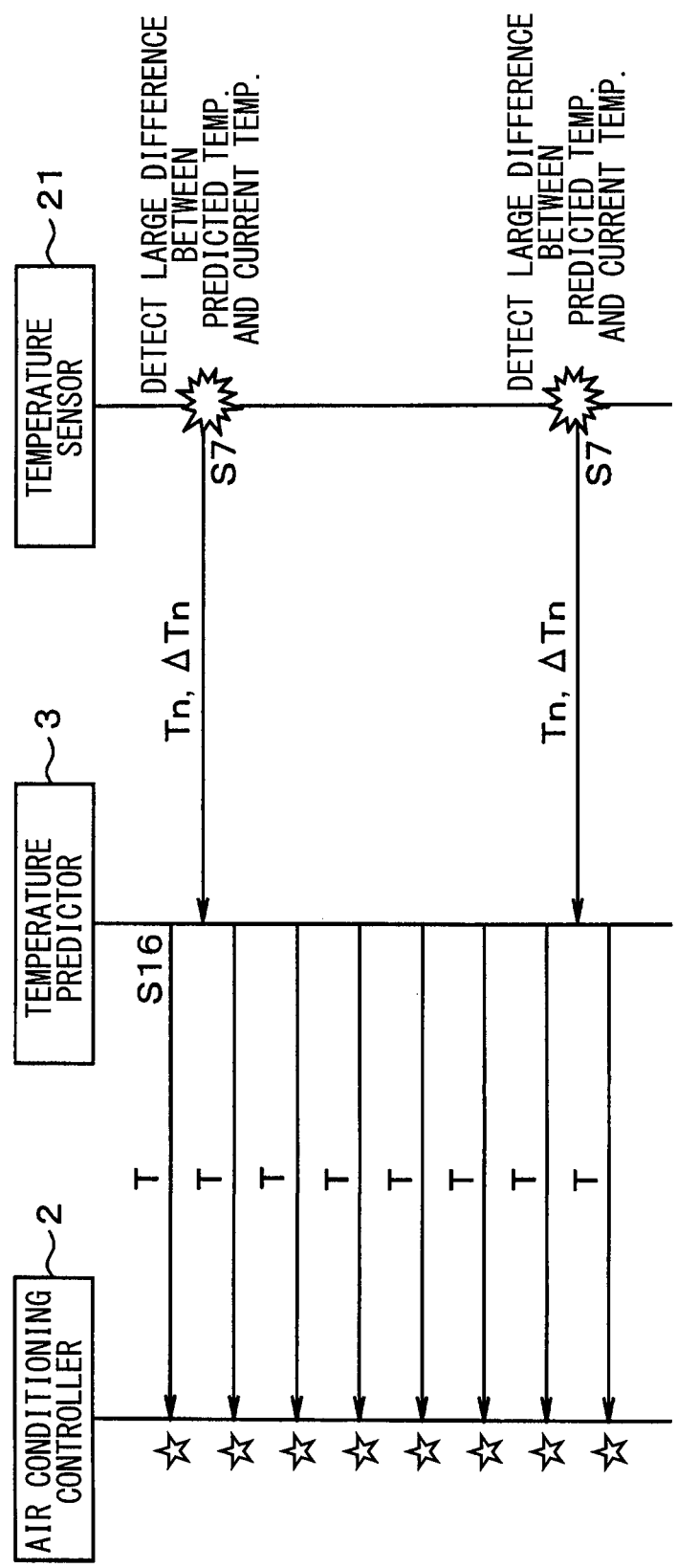
FIG. 7 is a sequence diagram showing communication processes performed between an air conditioning controller, a temperature predictor, and a temperature sensor according to at least one embodiment.
Figure 8:
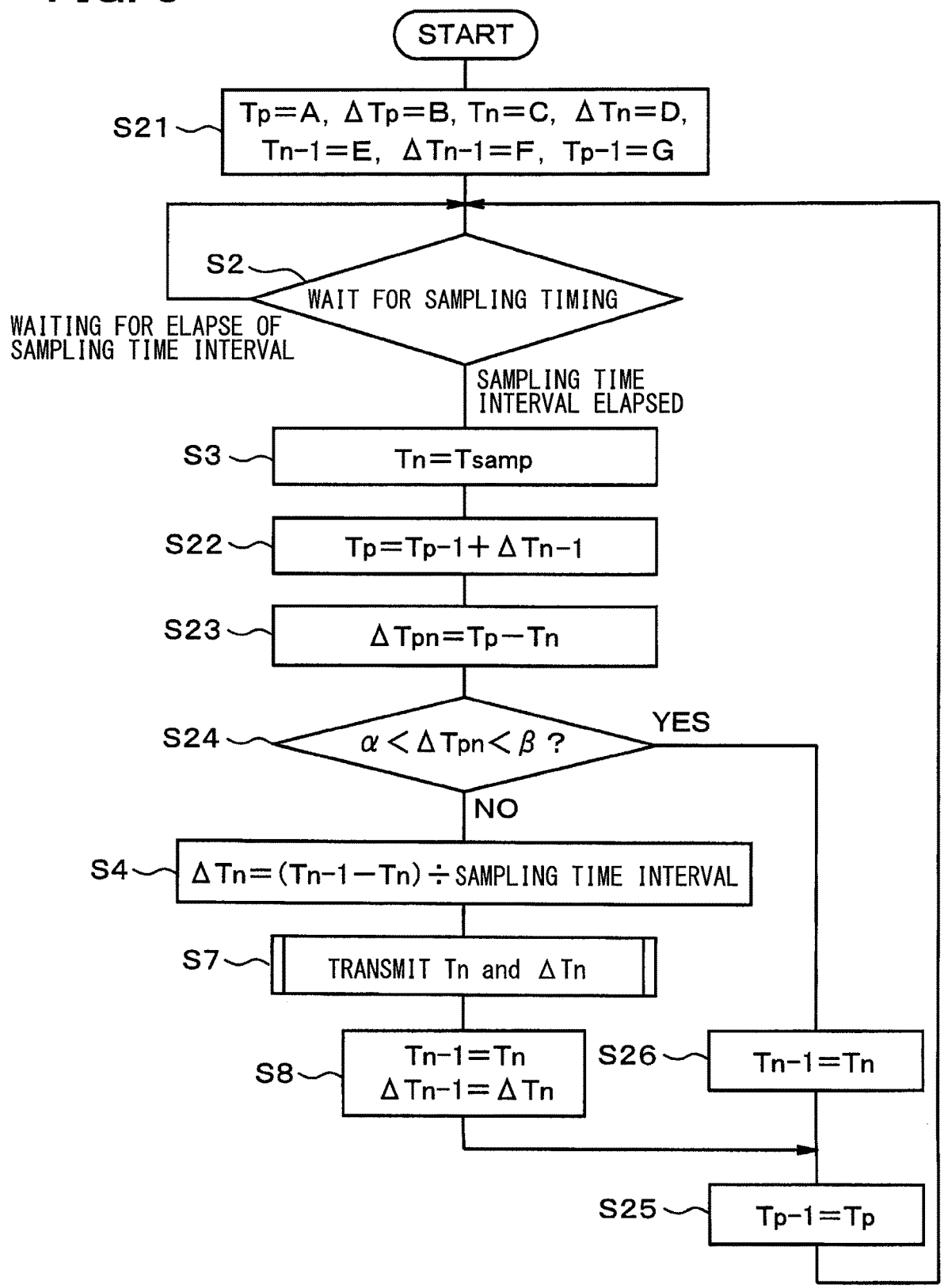
FIG. 8 is a flowchart showing a control process performed by a temperature sensor according to at least one embodiment.

Hereinafter, the same parts as those in the first embodiment will be designated by the same reference numerals and explanations thereof will be omitted. Differences from the first embodiment will be described. As shown in FIG. 7, a temperature sensor 21 of the second embodiment itself performs temperature prediction similarly to the temperature predictor 3. As shown in FIG. 8, at step S21 substituted for step S1, the temperature sensor 21 initializes a predicted temperature Tp, a predicted temperature gradient $\Delta Tp$, a detected temperature Tn of the current control cycle, a temperature gradient $\Delta Tn$ of the current control cycle, a detected temperature Tn-1 of the last control cycle, a temperature gradient $\Delta Tn\text{-}1$ of the last control cycle, a predicted temperature Tp-1 of the last control cycle, respectively, to arbitrary values A, B, C, D, E, F and G. Then, after performing steps S2 and S3, temperature prediction is performed at step S22 by using the temperature gradient $\Delta Tn\text{-}1$ according to the equation: $Tp=Tp\text{-}1+\Delta Tn\text{-}1$ Next, at step S23, the temperature sensor 21 calculates a difference $\Delta Tpn$ between the predicted temperature Tp and the temperature Tn detected at step S3 by subtracting Tn from Tp: $\Delta Tpn=Tp-Tn$. Then, the temperature sensor 21 determines at step S24 whether the temperature difference $\Delta Tpn$ is within an allowable range by using an inequality: $\alpha<\Delta Tpn<\beta$. The thresholds $\alpha$ and $\beta$ are also arbitrarily determined. When the temperature difference $\Delta Tpn$ is within the allowable range at step S24 (YES), the temperature variable Tn is substituted for the variable Tn-1 at step S26.

Then, the variable Tp of the predicted temperature is substituted into the variable Tp-1 at step S25, and the process returns to step S2.

On the other hand, When the temperature difference ΔTpn is out of the allowable range at step S24 (NO), steps S4 and S7 are executed, and the temperature variable Tn is substituted for the variable Tn-1, and the gradient variable ΔTn is substituted for ΔTn-1 at step S8 before proceeding to step S25. The process performed by the temperature predictor 3 is the same as that of the second embodiment.

As described above, according to the second embodiment, the temperature sensor 21 also predicts the temperature based on the temperature gradient ΔTn-1 obtained last time by itself. Then, when the difference ΔTpn between the actually detected temperature Tn and the predicted temperature Tp exceeds the certain range, the temperature sensor 21 calculates the temperature gradient ΔTn at that time and transmits the calculated temperature gradient ΔTn together with the detected temperature Tn via wireless communication. The temperature predictor 3, similar to the first embodiment, generates temperature information of a predicted temperature in each of the multiple spaces depending on elapsed time that passes from the receiving, and transmits the temperature information to the air conditioning controller 2.

That is, when the difference between the predicted temperature Tp and the actually detected temperature Tn becomes large, the temperature predictor 3 needs to update the information used for prediction. Therefore, in this case, the temperature sensor 21 transmits temperature information Tn, ΔTn via wireless communication to the temperature predictor 3. Accordingly, the temperature predictor 3 can update the information used for prediction at appropriate timing. Therefore, even when the temperature sensor 21 reduces the frequency of wireless communication, accuracy of the air conditioning control can be maintained without deteriorating.

Third Embodiment

Figure 9:
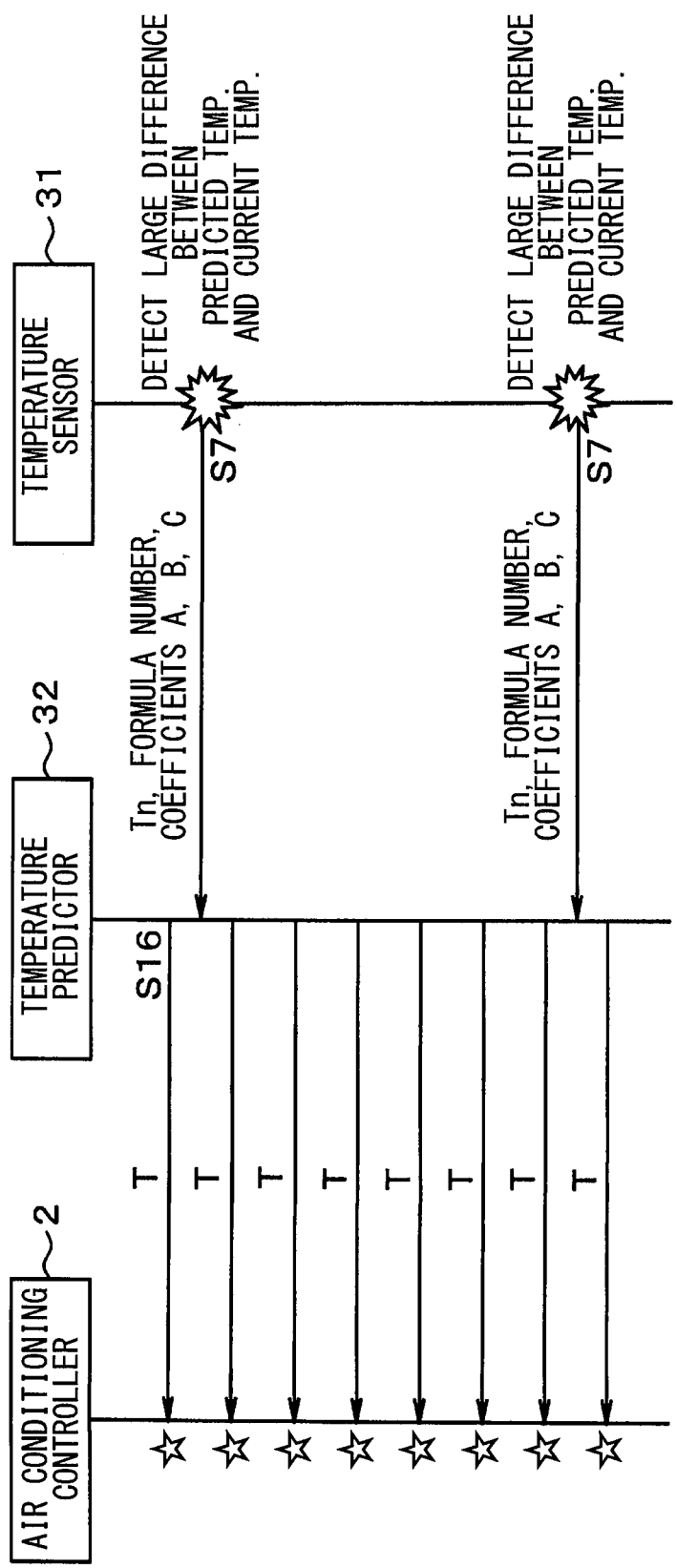
FIG. 9 is a sequence diagram showing communication processes performed between an air conditioning controller, a temperature predictor, and a temperature sensor according to at least one embodiment.
Figure 10:
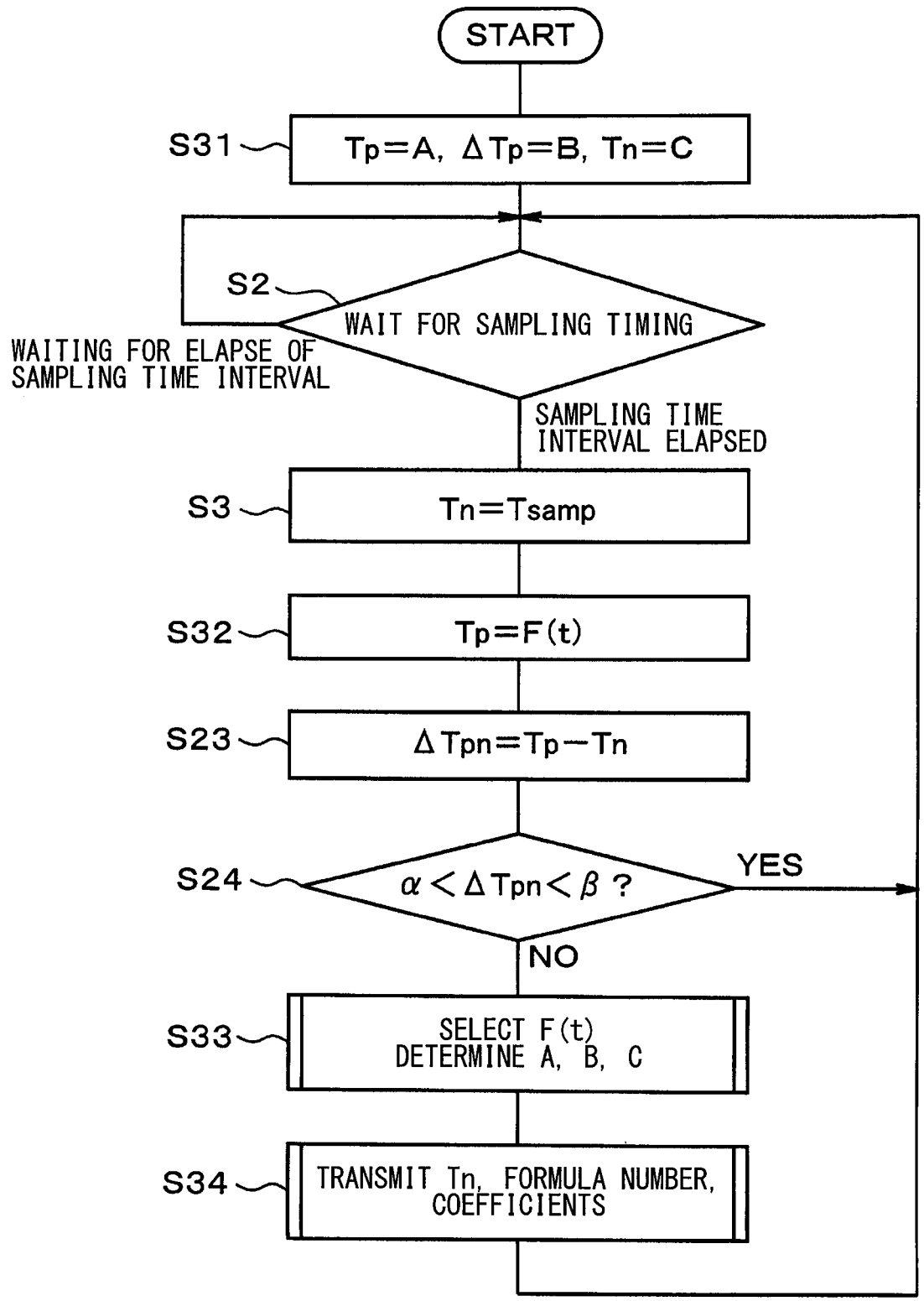
FIG. 10 is a flowchart showing a control process performed by a temperature sensor according to at least one embodiment.
Figure 11:
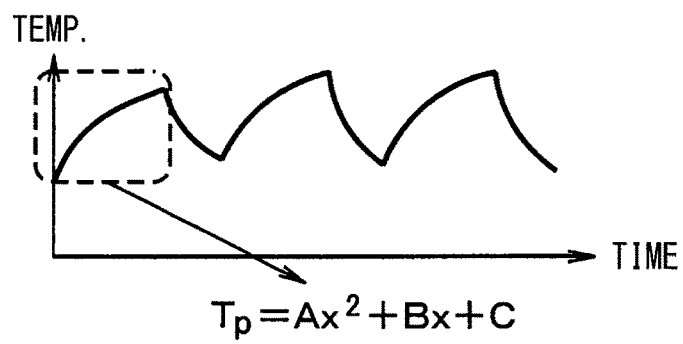
FIG. 11 is a diagram showing an example of a temperature prediction formula according to at least one embodiment.

As shown in FIG. 9, multiple prediction formulae are stored in a temperature sensor 31 according to a third embodiment in advance. The prediction formulae have been selected to conform to the past characteristics of temperature change and are used for temperature prediction as in the second embodiment. Then, temperature prediction is performed by appropriately selecting one of them. As shown in FIG. 10, the temperature sensor 31 performs initial settings at the first step S31 in the same manner as step S21, but the variables ΔTn, Tn-1, ΔTn-1 and Tp-1 are not used in the third embodiment. Then, after performing steps S2 and S3 similar to the second embodiment, temperature prediction is performed at step S32 by using a prediction formula F(t).

FIGS. 11 to 14 show examples of prediction formulae to be used. The formula shown in FIG. 11 uses a quadratic function, which is a temperature change pattern suitable for a room relatively high in airtightness and relatively large, and may be as follows, for example.

$$Tp = Ax^2 + Bx + C \qquad \text{Formula (1):}$$

Figure 12:
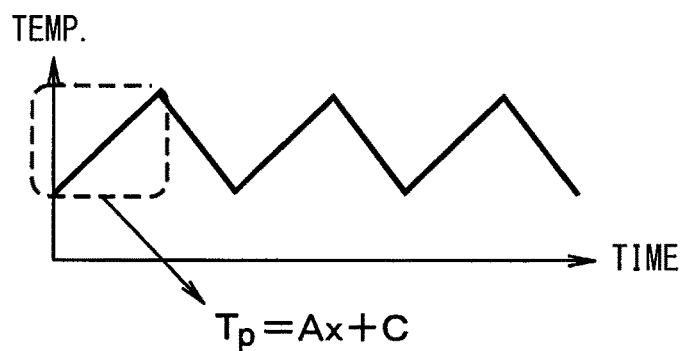
FIG. 12 is a diagram showing an example of a temperature prediction formula according to at least one embodiment.

The formula shown in FIG. 12 uses a linear function, which is a temperature change pattern suitable for a room relatively high in airtightness and relatively small, and the prediction formula may be as follows, for example.

$$Tp = Ax + C \qquad \text{Formula (2):}$$

Figure 13:
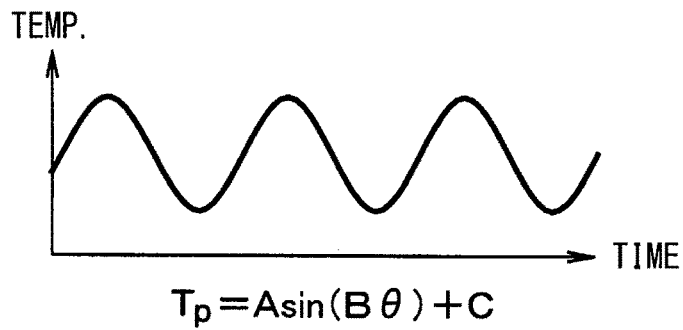
FIG. 13 is a diagram showing an example of a temperature prediction formula according to at least one embodiment.

The formula shown in FIG. 13 uses a sine function, which is a temperature change pattern suitable for a room relatively low in airtightness and relatively large, and the prediction formula may be as follows, for example.

$$Tp = A\sin(B\theta) + C \qquad \text{Formula (3):}$$

Figure 14:
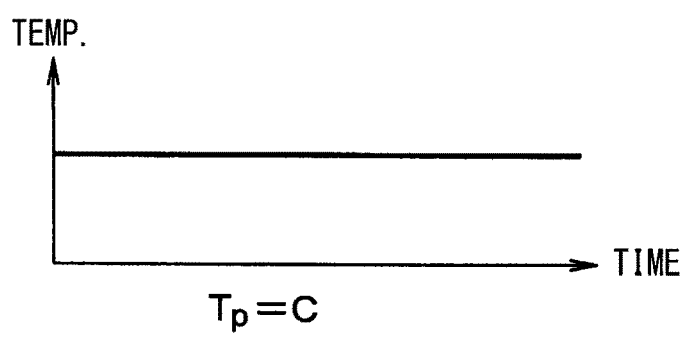
FIG. 14 is a diagram showing an example of a temperature prediction formula according to at least one embodiment.

The formula shown in FIG. 14 is a pattern in which temperature does not change and suitable for a room relatively low in airtightness and relatively small, and the prediction formula may be as follows, for example.

$$Tp = C \qquad \text{Formula (4):}$$

The coefficients A, B, and C are set differently for each prediction formula.

FIG. 10 is referred again. The temperature sensor 31 performs control operations at steps S23 and S24 as in the second embodiment, and when the temperature difference ΔTpn is within the allowable range at step S24 (YES), the process returns to step S2. When the temperature difference ΔTpn is out of the allowable range at step S24 (NO), the temperature sensor 31, at step S33, selects a prediction formula F(t) different from the prediction formula used at step S32 and determines the coefficients A, B, C corresponding to the selected prediction formula. Subsequently, at step S34, the temperature sensor 31 transmits the temperature Tn, the number unique to the selected prediction formula and the corresponding coefficients to the temperature predictor 32, and then the process returns to step S2.

The prediction formula F(t) used first at step S32 may be any one of the above-mentioned four. Also, the prediction formula F(t) selected next at step S33 may be any another. For example, the temperature sensor 31 may select Formula (1) first and then select in the order of Formula (2), Formula (3), and Formula (4) . . . . In addition, when it is empirically determined that there are many rooms for which the Formula (2) suitable, the Formula (2) may be selected first.

Figure 15:
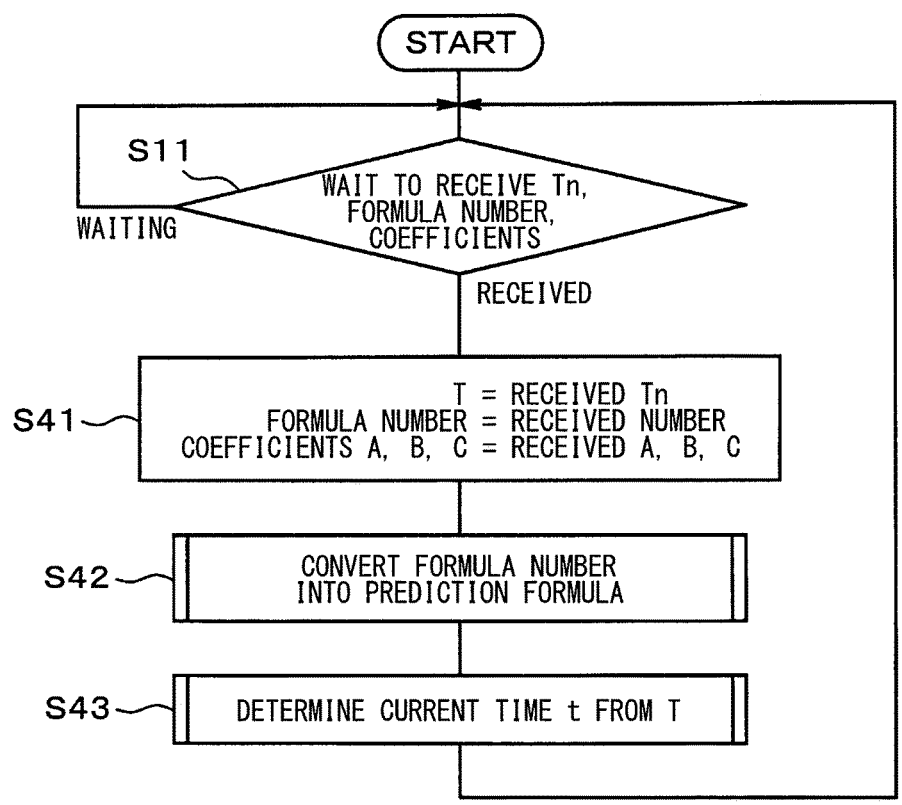
FIG. 15 is a flowchart showing a receiving standby process performed by a temperature predictor according to at least one embodiment.

As shown in FIG. 15, when the temperature predictor 32 receives the temperature Tn etc. from the temperature sensor 31 at step S11, the temperature predictor 32 sets the received data as "temperature variable T", "prediction formula number", "prediction formula coefficients A, B, C", respectively, at step S41. Subsequently, the temperature predictor 32 converts the "prediction formula number" into the corresponding prediction formula F(t) at step S42, and then determines the current time t from the "variable T" for the prediction formula F(t) at step S43.

Figure 16:
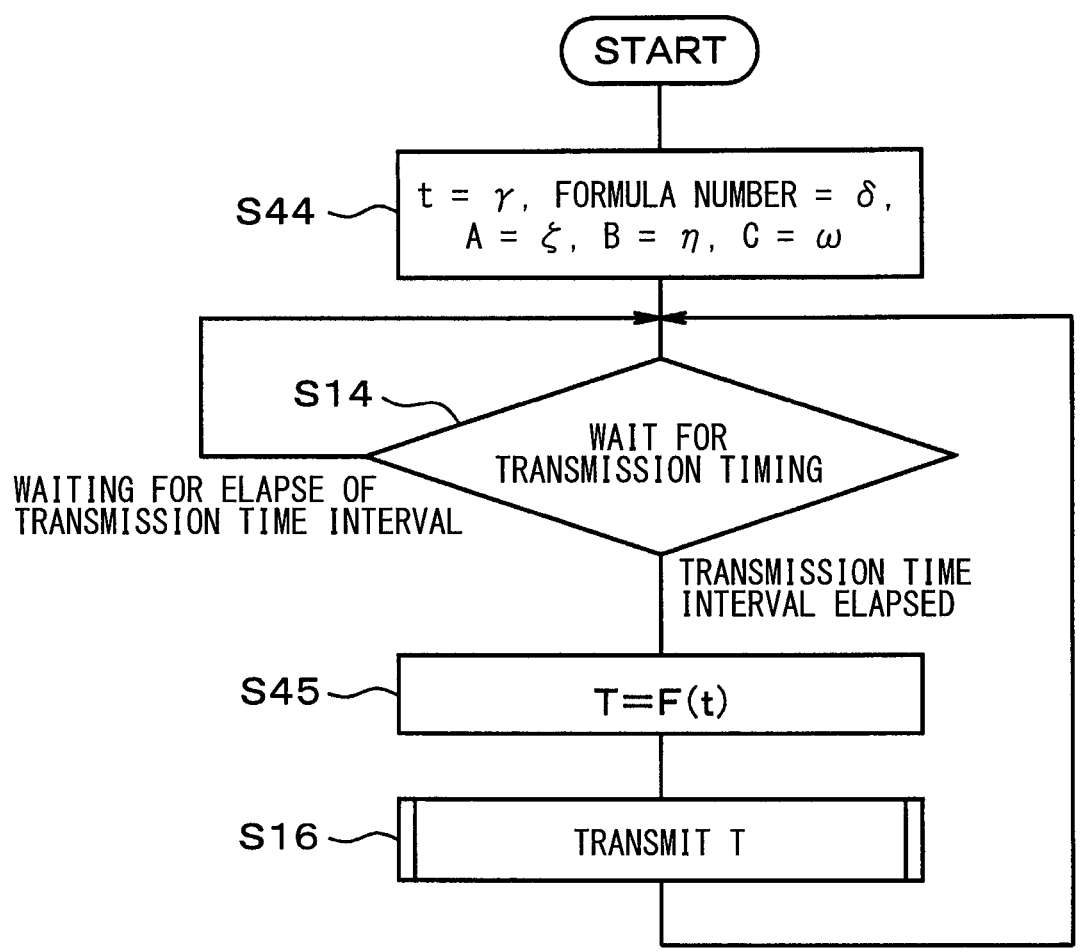
FIG. 16 is a flowchart showing a temperature prediction process performed by a temperature predictor according to at least one embodiment.

In the temperature prediction process shown in FIG. 16, the temperature predictor 32 initializes "time variable t", "prediction formula number", "prediction formula coefficients A, B, Cu", respectively, to arbitrary values γ, δ, ζ, η, ω at step S44. Then, the transmission timing is awaited at step S14, and when the transmission timing comes, temperature prediction is performed using the prediction formula F(t) at step S45. Then, a control operation at step S16 is executed.

As described above, according to the third embodiment, when the temperature sensor 31 detects the temperature at sampling time intervals, the temperature sensor 31 selects one of multiple temperature-change prediction formulae F(t) stored in advance and performs temperature prediction by using the selected prediction formula F(t). Then, when the difference ΔTpn between the actually detected temperature Tn and the predicted temperature Tp exceeds a certain range, the temperature sensor 31 newly selects another temperature prediction formula F(t) and transmits information of the detected temperature Tn and the using prediction formula F(t).

The temperature predictor 32, upon receiving them, predicts a temperature by using the prediction formula F(t) in each of the multiple spaces depending on elapsed time that passes from the receiving, and transmits the predicted temperature as temperature information to the air conditioning controller 2. As a result, the temperature predictor 32 can estimate the temperature using an appropriate prediction formula. In this case, by using the Formulae (1) to (4) as the prediction formula, for example, the temperature can be appropriately predicted by a suitable prediction formula depending on the size or airtightness of the space to be air conditioned.

The present disclosure is not limited only to the embodiments described above or shown in the drawings, and may be modified or expanded as follows.

The prediction formula is not limited to those exemplified above, and the prediction may be performed using more complicated functions.

In addition, three or less or five or more prediction formulae may be used.

The number of the spaces to be subjected to the air conditioning control may be "2" or "4" or more.

According to a central air conditioning system of a first aspect of the present disclosure, an air conditioning controller sends instructions to an air conditioning unit which can individually air condition the multiple spaces such that the air conditioning unit performs controls relating to the air conditioning of each space. The temperature sensor is disposed in each of the multiple spaces to detect the temperature and calculate the change amount of the temperature gradient at each sampling time interval. Then, when the change amount of the gradient exceeds a threshold, the detected temperature and the temperature gradient are transmitted by the temperature sensor via wireless communication. A temperature predictor, upon receiving them, generates temperature information of a predicted temperature in each of the multiple spaces depending on elapsed time that passes from the receiving, and transmits the temperature information to the air conditioning controller.

According to the above-described configuration, the temperature sensor transmits the temperature and the like to the temperature predictor only when the temperature of the corresponding space changes relatively largely. Therefore, a frequency of performing the wireless communication can be reduced. Further, even during the period in which the transmission from the temperature sensor to the temperature predictor is not performed, the temperature sensor predicts the temperature of the corresponding space based on the already received temperature and temperature gradient and transmits the temperature information to the air conditioning controller. Therefore, the air conditioning controller can instruct the air conditioning unit in each space to perform a control process based on the temperature information.

When the temperature of the corresponding space changes greatly, the temperature and the like are transmitted from the temperature sensor and the information thereof is updated, and the temperature predictor newly performs temperature prediction based on the updated information. Therefore, even when the temperature sensor reduces the frequency of wireless communication, accuracy of the air conditioning control can be maintained without deteriorating.

According to a second aspect of the present disclosure, the temperature sensor also predicts the temperature based on the temperature gradient obtained last time by itself. Then, when the difference between the actually detected temperature and the predicted temperature exceeds the certain range, the temperature sensor calculates the temperature gradient at that time and transmits the calculated temperature gradient together with the detected temperature Tn via wireless communication. The temperature predictor, similar to the first aspect, generates temperature information of a predicted temperature in each of the multiple spaces depending on elapsed time that passes from the receiving, and transmits the temperature information to the air conditioning controller.

That is, the temperature sensor performs the temperature prediction by the same method as that of the temperature predictor. Therefore, when the difference between the predicted temperature and the actually detected temperature becomes large, the temperature predictor needs to update the information used for prediction. Therefore, in this case, the temperature sensor transmits temperature information via wireless communication to the temperature predictor. Accordingly, the temperature predictor can update the information used for prediction at appropriate timing. Therefore, even when the temperature sensor reduces the frequency of wireless communication, accuracy of the air conditioning control can be maintained without deteriorating.

According to the central air conditioning system of a third aspect of the present disclosure, when the temperature sensor detects the temperature at sampling time intervals, the temperature sensor selects one of multiple temperature-change prediction formulae stored in advance, and performs prediction of detection temperature by using the selected prediction formula. The prediction formulae are prepared in advance by selecting ones which conform to past temperature change patterns of the history.

Then, when the difference between the actually detected temperature and the predicted temperature exceeds a certain range, the temperature sensor newly selects another temperature prediction formula and transmits information of the detected temperature and the using prediction formula. The temperature predictor, upon receiving them, predicts a temperature by using the prediction formula in each of the multiple spaces depending on elapsed time that passes from the receiving, and transmits the predicted temperature as temperature information to the air conditioning controller. As a result, the temperature predictor can estimate the temperature using an appropriate prediction formula.

As one of the prediction formulae, a formula approximating the temperature change by a linear function, a formula approximating the temperature change by a quadratic function, a formula approximating the temperature change by a sine function, and a formula in which the temperature is constant may be each used. The pattern of the temperature change depends to some extent on the size or airtightness of the space to be air conditioned.

For example, the temperature gradient is close to a straight line in a room high in airtightness and small in size, and the temperature gradient is close to a curve in a room high in airtightness and large in size. Also, the temperature gradient is close to a sine wave in a room low in airtightness and large in size, and the temperature does not change much in a room low in airtightness and small in size. Therefore, by using the above-described respective prediction formulae, the prediction temperature can be made to conform to some extent the actual temperature change according to each target space.

The temperature predictor 3, 32 described in the above embodiments may be fully implemented by a special purpose computer created by configuring a processor programmed to execute one or more particular functions embodied in computer programs. Alternatively, the temperature predictor 3, 32 may be fully implemented by special purpose hardware logic circuits. Further alternatively, the temperature predictor 3, 32 may be implemented by a special purpose computer created by a combination of a processor executing computer programs coupled with hardware logic circuits.

What is claimed is:

1. A central air conditioning system comprising:
dampers configured to individually air-condition a plurality of spaces;
an air conditioning controller configured to instruct the dampers to perform a control operation for the individual air conditioning of the plurality of spaces;
a temperature sensor disposed in each of the plurality of spaces and configured to:
  detect a temperature and calculate an amount of change in temperature gradient at sampling time intervals;
  determine whether the amount of change in temperature gradient exceeds an allowable range; and
  transmit the detected temperature and the temperature gradient via a wireless communication when the amount of change in temperature gradient is determined to exceed the allowable range; and
a temperature predictor, upon receiving the temperature and the temperature gradient, configured to:
  predict a temperature in each of the plurality of spaces to generate temperature information depending on elapsed time that passes from the timing of the receiving of the temperature and the temperature gradient; and
  transmit the temperature information to the air conditioning controller.

2. A central air conditioning system comprising:
dampers configured to individually air-condition a plurality of spaces;
an air conditioning controller configured to instruct the dampers to perform a control operation for the individual air conditioning of the plurality of spaces;
a temperature sensor disposed in each of the plurality of spaces and configured to:
  detect a temperature at sampling time intervals;
  predict a temperature based on a temperature gradient calculated last time;
  determine whether a difference between the predicted temperature and the actually detected temperature exceeds a certain range; and
  newly calculate the temperature gradient and transmit the calculated temperature gradient together with the detected temperature via a wireless communication when the difference between the predicted temperature and the actually detected temperature is determined to exceed the certain range; and
a temperature predictor, upon receiving the temperature and the calculated temperature gradient, configured to:
  predict a temperature in each of the plurality of spaces to generate temperature information depending on elapsed time that passes from the timing of the receiving of the temperature and the calculated temperature gradient; and
  transmit the temperature information to the air conditioning controller.

3. A central air conditioning system comprising:
dampers configured to individually air-condition a plurality of spaces;
an air conditioning controller configured to instruct the dampers to perform a control operation for the individual air conditioning of the plurality of spaces;
a temperature sensor disposed in each of the plurality of spaces and configured to:
  detect a temperature at sampling time intervals;
  predict a temperature by using one of multiple prediction formulae which have been stored in the temperature sensor in advance for temperature prediction; and
  newly select another of the multiple prediction formulae and transmit information of the detected temperature and the selected prediction formula when a difference between the predicted temperature and the actually detected temperature exceeds a certain range; and
a temperature predictor, upon receiving the information of the detected temperature and the selected prediction formula, configured to:
  predict a temperature in each of the plurality of spaces by using the selected prediction formula to generate temperature information depending on elapsed time that passes from the timing of the receiving of the information of the detected temperature and the selected prediction formula; and
  transmit the temperature information to the air conditioning controller.

4. The central air conditioning system according to claim 3, wherein one of the multiple prediction formulae is a formula obtained by approximating a temperature change by a linear function.

5. The central air conditioning system according to claim 3, wherein one of the multiple prediction formulae is a formula obtained by approximating a temperature change by a quadratic function.

6. The central air conditioning system according to claim 3, wherein one of the multiple prediction formulae is a formula obtained by approximating a temperature change by a sine function.

7. The central air conditioning system according to claim 3, wherein one of the multiple prediction formulae is a formula in which a temperature is constant.

* * * * *